US009370677B2

(12) United States Patent
Ruiz et al.

(10) Patent No.: US 9,370,677 B2
(45) Date of Patent: Jun. 21, 2016

(54) HYDROTHERMAL OXIDATION DEVICE FOR TREATING A MATERIAL IN A SUPERCRITICAL MEDIUM AND IMPLEMENTATION METHOD

(71) Applicant: Commissariat a l'energie atomique et aux energies alternatives, Paris (FR)

(72) Inventors: Jean Christophe Ruiz, Laudun l'Ardoise (FR); Hubert-Alexandre Turc, Les Angles (FR); Frederic Charton, Bagnols sur Ceze (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/760,567

(22) PCT Filed: Jan. 20, 2014

(86) PCT No.: PCT/EP2014/051049
§ 371 (c)(1),
(2) Date: Jul. 13, 2015

(87) PCT Pub. No.: WO2014/111581
PCT Pub. Date: Jul. 24, 2014

(65) Prior Publication Data
US 2015/0352391 A1    Dec. 10, 2015

(30) Foreign Application Priority Data
Jan. 18, 2013    (FR) ...................................... 1350427

(51) Int. Cl.
| | |
|---|---|
| *A62D 3/38* | (2007.01) |
| *B09B 3/00* | (2006.01) |
| *B01J 19/18* | (2006.01) |
| *B01J 3/00* | (2006.01) |
| *B01J 3/02* | (2006.01) |
| *A62D 101/20* | (2007.01) |

(52) U.S. Cl.
CPC . *A62D 3/38* (2013.01); *B01J 3/008* (2013.01); *B01J 3/02* (2013.01); *B01J 19/1812* (2013.01); *B01J 19/1843* (2013.01); *A62D 2101/20* (2013.01); *B01J 2208/00761* (2013.01); *B01J 2219/00083* (2013.01); *B01J 2219/00087* (2013.01); *B01J 2219/00135* (2013.01); *B01J 2219/00761* (2013.01); *Y02P 20/544* (2015.11)

(58) Field of Classification Search
CPC .................................... A62D 3/38; B09B 3/00
USPC ........................................ 588/320; 422/184.1
See application file for complete search history.

(56) References Cited

U.S. PATENT DOCUMENTS

| | | | |
|---|---|---|---|
| 5,500,120 | A | 3/1996 | Baker |
| 5,552,039 | A | 9/1996 | McBrayer, Jr. et al. |
| 7,708,897 | B2 | 5/2010 | Joussot-Dubien et al. |
| 7,988,869 | B2 | 8/2011 | Turc et al. |
| 8,414,842 | B2 | 4/2013 | Turc et al. |
| 2004/0011746 | A1 | 1/2004 | Joussot-Dubien et al. |
| 2008/0135496 | A1 | 6/2008 | Joussot-Dubien et al. |

FOREIGN PATENT DOCUMENTS

| | | |
|---|---|---|
| DE | 101 20 581 A1 | 10/2002 |
| FR | 2 891 161 A1 | 3/2007 |
| WO | WO 02/30836 A1 | 4/2002 |

OTHER PUBLICATIONS

International Search Report issued May 20, 2014, in PCT/EP2014/051049, filed Jan. 20, 2014.
French Preliminary Search Report issued Oct. 2, 2013, in Patent Application No. FR 1350427, filed Jan. 18, 2013.
J.C. Viala, et al., "Diffusion paths and reaction mechanisms in the high-temperature chemical interaction between carbon and titanium aluminides", Materials Science and Engineering, vol. A203, 1995, pp. 222-237.
Joanne L. Murray, et al., "Calculation of the Titanium-Aluminum Phase Diagram", Metallurgical Transactions A, vol. 19A, Feb., 1988, pp. 243-247.
Tetsuya Nukami, et al., "In Situ Synthesis of TiC Particulate-Reinforced Aluminum Matrix Composites", Metallurgical and Materials Transactions A, vol. 26A, Jul. 1995, pp. 1877-1884.

*Primary Examiner* — Edward Johnson
(74) *Attorney, Agent, or Firm* — Oblon, McClelland, Maier & Neustadt, L.L.P.

(57) ABSTRACT

A hydrothermal oxidation device for treatment of a material in a supercritical medium includes a main body, an internal tube installed inside the main body to form an annular zone along the main body, a stirring mechanism installed in an internal zone of the internal tube and actuated by a rotating shaft, a cooling mechanism to cool the treated material located in the internal zone of the internal tube, an inlet for water and oxidant mix, an effluents outlet, an inlet for material to be treated, located at one end of the main body, this inlet opening up into the internal tube. The oxidation device includes an inlet for a diluted effluent, located in the flange and connected to a preheating coil arranged along an internal wall of the main body and extending from its first end to its second end, the preheating coil opening up into the internal tube.

12 Claims, 1 Drawing Sheet

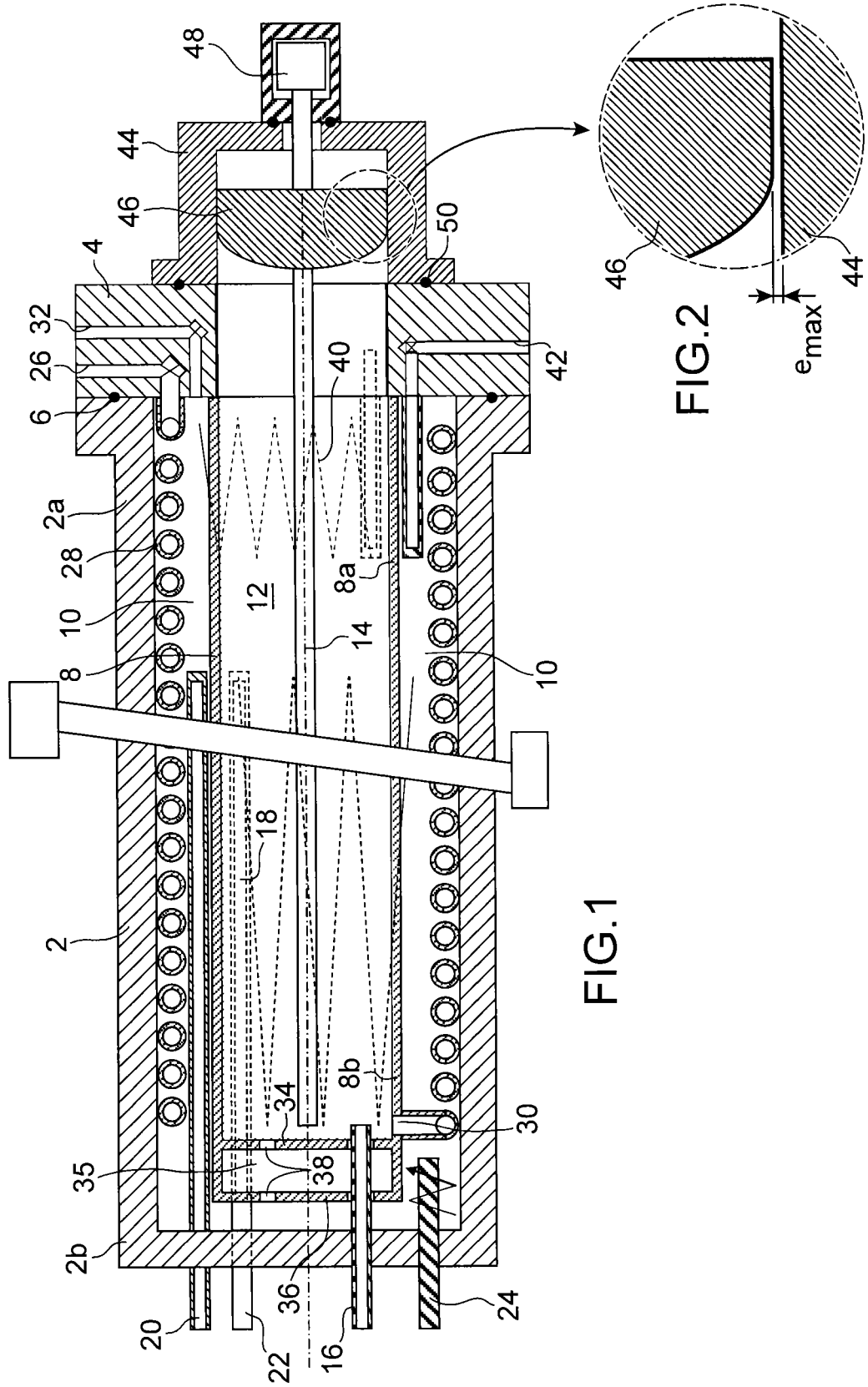

HYDROTHERMAL OXIDATION DEVICE FOR TREATING A MATERIAL IN A SUPERCRITICAL MEDIUM AND IMPLEMENTATION METHOD

This invention relates to a hydrothermal oxidation device for treatment of a material in a supercritical medium. It also relates to a method of treating a material by hydrothermal oxidation.

More precisely, this invention relates to a hydrothermal oxidation device comprising:
- a main body provided with a cold interface flange at one of its ends, sealing means between the main body and the flange, the main body, the flange and the sealing means being made from materials resistant to pressures and temperatures in supercritical media,
- an internal tube installed inside the main body so as to form an annular zone along the main body, the internal tube comprising a cold first end and a hot second end, the first end of the internal tube being fixed in a sealed manner to the cold interface flange, the internal tube delimiting an internal reaction zone,
- a stirring means installed in the internal reaction zone of the internal tube and actuated by a rotating shaft,
- a cooling means to cool the treated material located in the internal reaction zone of the internal tube before it is evacuated from the oxidation device through a treated material outlet,
- an inlet for a water and oxidant mix located at the cold first end of the main body, the water and oxidant mix passing through the annular zone from the cold first end to the hot second end of the internal tube before penetrating into the internal reaction zone of the internal tube,
- an effluents outlet located at the cold first end of the main body,
- an inlet for material to be treated, located at the hot second end of the main body, this inlet opening up into the internal tube at its second end.

A hydrothermal oxidation device of this type is already known (WO 02/30836). This document relates to a method and an autoclave for oxidation of organic material in supercritical water. This stirred double envelope continuous autoclave has been widely used for various OHT applications in the laboratory. Organic waste from various origins has been destroyed successfully without causing any clogging or corrosion problems. However, in the case of waste with high net caloric value (NCV), control of the reaction temperature depends partly on the dilution of the reaction medium with the method, impacting the volume of aqueous effluents generated. Moreover, destruction efficiencies for waste with a low NCV are high, close to 99%, but are less than efficiencies observed for waste with a high NCV (destruction efficiency 99.9%). The relatively low destruction efficiencies observed for waste with a low NCV are due to the lack of any significant thermal effects related to the reaction and insufficient preheating.

The purpose of this invention is to provide a device for thermal control of hydrothermal oxidation of organic materials. According to one advantageous variant, this device can also be used for mechanical management of solids induced by the OHT reaction.

According to the main characteristic of the invention, the oxidation device comprises an inlet for a diluted effluent located in the cold interface flange and connected to a preheating coil located along the internal wall of the main body and extending from its cold first end to its hot second end, the preheating coil opening up into the reaction zone of the internal tube at this hot second end.

According to one preferred characteristic, the hydrothermal oxidation device according to the invention comprises a heat exchanger forming a hot loop heat sink located in the annular zone and in a peripheral zone located adjacent to the hot second end of the internal tube, the hot loop heat sink drawing off heat from the hydrothermal oxidation reaction that occurs in the second end of the internal zone of the internal tube.

Preferably, the hydrothermal oxidation device comprises a reaction antechamber located on the same side as the hot second end of the internal tube, the reaction antechamber being formed by an internal wall and external wall closing off the internal tube, a communication passage for the mix of water and oxidant being formed in each of the internal and external walls.

Also preferably, the hydrothermal oxidation device comprises an electrical heating means located in the main body and opening up in the annular space close to the reaction antechamber, this heating means being protected by this arrangement from chemical aggression induced by the waste or the hydrothermal oxidation reaction.

Advantageously, the hydrothermal oxidation device according to the invention comprises a heat exchanger forming a cold loop heat sink that lowers the temperature of the fluid medium after the reaction and before it exits from the reactor so as to guarantee conditions for the resistance of sealing devices of the main body on the flanges and to optimise solubilisation of the precipitated mineral species.

Also advantageously, the hydrothermal oxidation device according to the invention comprises a solids management module, this module being in the form of a lid that closes off a through orifice formed in the flange, cold sealing means being provided between the solids management module and the flange. Preferably, the solids management module is driven in rotation by a magnetic drive. The solids management module has a circular shape in its axial section. It is adjusted with a clearance $e_{max}$ in a diameter corresponding to the solids management module, the solids management module being capable of mechanical treatment of solids present in the cooled effluent output from the hydrothermal reaction and capable of bringing these solids to a size grading chosen to avoid clogging the pipes and equipment on the downstream side of the solids management module.

This invention also relates to a method for continuous treatment of a material by hydrothermal oxidation.

This method comprises the following steps:
a) introduction of a fluid comprising water and an oxidant into a reactor at a pressure of more than 22.1 MPa, in an annular zone formed between an internal wall of a main body of the reactor and an internal tube in the main body, at a cold first end of the main body;
b) heating of the water/oxidant fluid in the annular zone to a temperature of more than 374° C.;
c) introduction of the heated water/oxidant fluid under pressure obtained in step b) into the internal tube of the reactor at a hot second end of the main body and simultaneous introduction of the material to be treated into the internal tube at the hot second end of the main body;
d) mix of the heated water/oxidant fluid under pressure and the material to be treated in a first part of the internal tube so as to oxidise the material to be treated and cooling of the fluid/oxidised material mix thus obtained in a second part of the internal tube;
e) evacuation of the fluid/oxidised material mix from the reactor at a cold first end of the main body.

According to the invention, this method also comprises a step in which a diluted effluent is added into a preheating coil, the coil inlet being located at the cold first end of the main body, the coil being wound along the internal wall of the main body and opening up in the first part of the internal tube.

According to the invention, the core of the continuous hydrothermal oxidation method is designed to perform the following functions:

injection of waste that may contain a high or low proportion of water (high net calorific value) in the presence of an oxide that may or may not be mixed with water, preheating of the fluids before the OHT reaction by recovery of energy released by combustion of the organic waste, continuous mix of reagents (organic waste, water, oxidant) with a continuous combustion reaction being set up while stirring, the OHT reaction being confined to a distance from the pressurised autoclave walls by insertion of a wall made of a material chosen for its resistance to aggression induced by the combustion reaction (corrosion, abrasion) and by the implementation of a zone performing dynamic confinement of the OHT reaction in the reaction zone.

The hydrothermal oxidation method is also designed to perform the following functions:

recovering of excess thermal power released by the OHT reaction to an external circuit that assures uniformity of the temperature in the reaction zone and limits the temperature to which the equipment under pressure is exposed, injection of superheating power immediately adjacent to the reaction zone without exposure of the heating equipment to aggression caused by the OHT reaction for fast heating and initiation of the OHT reaction starting from the cold equipment, and superheating of water/oxidant fluids before the mix and initiation of the OHT reaction in the case in which operating conditions set up are not sufficient to achieve stable spontaneous ignition of the OHT reaction in the case of solvents with low NCV, continuous cooling of combustion reaction products with complementary use of an external circuit, management of products of reaction with solids present in the effluents cooled by mechanical grading and possibly by cold re-solubilisation.

According to one preferred characteristic, the method comprises an additional step in which a reaction zone located inside the internal tube is cooled at a second end of this internal tube by means of a heat exchanger forming a hot loop heat sink arranged in contact with the internal tube.

Preferably, the water/oxidant fluid in the annular space between the internal wall of the main body and the external wall of the internal tube is heated using one or several electrical resistances located immediately adjacent to the reaction zone, the hot loop heat sink and the heat produced by the hydrothermal reaction.

Advantageously, heat is extracted from the internal tube close to its first end by means of a heat exchanger forming a cold loop heat sink, this exchanger lowering the temperature of the fluid medium after the hydrothermal reaction and before it exits from the reactor.

According to one preferred characteristic, the solids present in the cooled effluent are treated mechanically by grinding them between an internal wall of a solids management module connected to a flange of the reactor and an external wall of a solids treatment rotor so as to obtain a sufficiently fine size grading chosen to not clog up the pipes and the equipment downstream from the solids management module.

The method according to the invention also facilitates maintenance of internal equipment in the main body of the reactor by means of an autoclave flange kept cold under operating conditions. The operating temperature of this flange enables the use of simple and robust sealing means, for example Viton® seals.

Other characteristics and advantages of this invention will become clear after reading the following description of an example given for illustrative purposes with reference to the appended figures. In these figures:

FIG. 1 is a longitudinal section showing an overview of a hydrothermal oxidation device according to this invention;

FIG. 2 is a detailed sectional view of a solids management module forming part of a hydrothermal oxidation device according to this invention.

FIG. 1 shows a sectional overview of a hydrothermal oxidation device according to this invention. This device comprises a main body 2 comprising a cold first end 2a and a hot second end 2b. The main body is closed off at its second end 2b. It comprises a flange 4 at its first end 2a. The flange 4 is connected to the first end 2a of the main body 2. Sealing means 6 are provided between the flange 4 and the main body 2. The main body 2 and the flange 4 are made from materials resistant to pressures and temperatures of supercritical media. The operating temperature of the flange 4 enables the use of simple and robust sealing means (Viton®). The body 2 is thermally insulated on its external surface (not shown). It is preferably placed horizontally.

An internal tube 8 is placed inside the main body 2. The internal tube 8 delimits an annular zone 10 along the main body 2. The internal tube 8 comprises a cold first end 8a and a hot second end 8b. The first end 8a of the internal tube 8 is fixed to the flange 4 in a sealed manner. The internal tube 8 delimits an internal zone 12. The internal tube 8 is made from a material with chemical resistance to aggressions induced by the OHT reaction. Depending on the available space and required heat exchanges, it may be fitted with welded ribs or baffles on its outside surface over all or some of its length (not shown). These ribs and/or baffles participate in improving the heat treatment by varying the hydrodynamics of the flow in the annular zone and increasing the heat exchange area between the reaction medium and the annular space 10, by creating a secondary exchange area.

A stirring means is placed in the internal zone 12 of the internal tube 8. This stirring means is actuated by means of a rotating shaft 14. The inside zone of the internal tube 8 defines a reaction zone.

An injection tube 16 is mounted at the closed-off end (hot second end 2b) of the main body 2. The injection tube 16 forms an effluent injection point through which organic material is introduced into the reaction zone 12 through the injection tube 16. A heat exchanger 18 comprising an inlet 20 and an outlet 22 is located at the periphery of the internal tube 8. A coolant circulates inside the exchanger 18. The coolant is supplied and treated by an external circuit connected to the inlet 20 and the outlet 22 of the coolant. The exchanger 18 is located at the immediate periphery of the internal tube 8. Its function is to remove heat from the reaction zone 12. The exchanger 18 is protected from aggression from the OHT reaction by the internal tube 8. Insertion of this exchanger into the main body 2 makes it necessary for the walls to have resistance to a mechanical compression stress imposed by the working pressure. The exchanger 18 is preferably made from a material with good heat conducting properties.

The main body is provided with an electrical heating means at its second end 2b. This heating means is composed of one or several heating cartridges 24 passing through the bottom wall of the main body 2 and immersed in the water/oxidant mix. The heating means 24 is located in the annular zone 10 between the internal tube 8 and the internal wall of the main body 2. The heating means 24 are located in the immediate vicinity of the reaction zone 12 so as to superheat the water/oxidant mix such that temperature conditions conducive to ignition of the OHT reaction in the internal tube 12 are achieved.

The main body 2 comprises the cold interface flange 4 at its first end 2a. This flange is provided with an injection point 26 for the effluent diluted with a high proportion of water. The injection point 26 is composed of a radial channel perforated in the cold interface flange 4 and an axial channel and is connected to a spiral exchanger 28 adjacent to the internal wall of the main body 2. The exchanger 28 opens up at the top of the internal tube 8 (reference 30). The interface flange 4 also has an injection point for the water/oxidant mix 32 feeding the annular zone 10.

The internal tube 8 is supplied by the preheating coil 28 containing diluted effluent derived from the injection 26.

Furthermore, the internal tube 8 comprises a reaction antechamber located on the side of the hot second end 8b of the internal tube 8. The reaction antechamber is formed from an internal wall 34 and an external wall 36 closing off the second end 8b of the internal tube. A passage 38 for mixing water and oxidant is formed in the internal wall 34 and the external wall 36.

The internal tube 8 and more precisely the reaction volume 12 is fed by the water/oxidant mix after it has passed through the annular zone 10 to come into communication with the reaction antechamber 35. The internal tube 8 is still fed by injection of waste with high net calorific value (NCV) injected through the injection tube 16 that opens up directly into the reaction volume 12.

There is a cold exchanger 40 at the first end of the internal tube 8 located at the periphery of the internal tube 8. A coolant circulates in the exchanger 40. This coolant is supplied and treated by an external circuit connected to the inlet line 42 and the outlet line (not shown) of the coolant. The cold exchanger 40 is protected from aggression from the OHT reaction by the internal tube 8. Insertion of this exchanger into the main body makes it necessary for the walls to be resistant to the mechanical compression stress imposed by the working pressure. The exchanger is preferably made from a good heat conducting material.

In one preferred embodiment of the invention, the end 8a of the internal tube comprises an additional cold exchanger located on the downstream side of the cold exchanger 40 and additional to it. This additional cold exchanger is installed inside the internal tube 8 just on the upstream side of the cold flange 4. A coolant circulates in the additional exchanger. The coolant is supplied and treated by an external circuit connected to the inlet and outlet of the exchanger. Although this additional cold exchanger is in contact with the reaction medium 12, it is protected from the risk of corrosion by the temperature drop caused by the first exchanger 40. Insertion of this exchanger into the autoclave makes it necessary for the walls to be resistant to a mechanical compression stress imposed by the working pressure.

According to one variant embodiment, this cold exchanger may be inserted in the cold interface flange 4.

The stirring means enables mixing of the fluid in the reaction zone 12 from the injection point of the effluents 16 with high net calorific value and the reaction antechamber 35 as far as being in line with the cold interface flange 4. There is a solids treatment module 44 fixed on the cold flange 4. The solids treatment module 44 comprises a solids treatment rotor 46 sized such that it cooperates with the wall of the module 44 to form a passage with a maximum gap of $e_{max}$ (see FIG. 2). The solids treatment rotor 46 is driven in rotation by a magnetic drive 48. It has a circular shaped axial section, and is adjusted to have a clearance $e_{max}$ in a corresponding diameter of the solids management module. The solids treatment rotor 46 can treat solids present in the cooled effluent output from the hydrothermal reaction. It brings these solids to a sufficiently small size grading so that pipes and equipment located downstream from the solids management module 44 are not clogged.

The invention is capable of making a simple and efficient leak seal between firstly the end 2a of the main body 2 and the flange 4, and secondly between the flange 4 and the solids management module 44, for a working pressure on a fluid and materials kept cold by means of the cold exchangers 40 and possibly the additional exchanger. This seal may be made by simple and robust seals (seal 6 between the end 2a of the main body and the cold flange 4 and seal 50 between the cold flange 4 and the solids management module 44). The invention can also define a geometry allowing inspection of the condition of the internal equipment in the main body 2 and easy maintenance by disassembly of the solids management module 44 to access the stirring means shaft 14 and the solids stirring rotor (not shown) and the solids treatment rotor 46. The flange 4 can be disassembled to access the external wall of the internal tube 8, the hot heat exchanger 18 and the cold heat exchanger 40, and the preheating coil 28 and the internal wall of the main body 2.

The following explains operation of the hydrothermal oxidation device shown in FIGS. 1 and 2 under steady state conditions. This operation is described under the following steady state conditions:

reactor at working pressure,
continuous feed (stable flow) of organic material. The inlet(s) 26 and/or 16 are used depending on needs,
continuous feed (stable flow) of water and oxidant,
thermal equilibrium resulting from the release of heat from the OTH reaction, heat exchanges (hot and cold exchangers 18, 40) and feed fluid temperatures.

The stirring means rotor 14 and the solids treatment rotor 46 rotate continuously at a speed imposed by the external motor 48 via a magnetic drive. The mix located in the reaction volume is thus kept stirred maintaining a pulsed flow as closely as possible, equivalent to a sequence of perfectly stirred continuous reactors.

Hydrothermal conditions in supercritical water are such that the OHT combustion reaction can start as soon as the waste obtained from the inlet of the diluted effluent 26 and/or the injection tube 16 and water and oxidant obtained from the inlet 32 are mixed. Once initiated, the combustion reaction releases thermal power transmitted in the fluid of the reaction volume 12. Transfer of heat to the wall of the internal tube 8 is facilitated by turbulence produced by the stirring means 14. This heat flow is then transmitted to the fluid in which the internal tube 12 is immersed, namely the water/oxidant mix that circulates in the annular zone 10 in the opposite direction to the fluid flow in the reaction volume 12. The wall of the internal tube 8 thus forms a reverse current heat exchanger and the water/oxidant mix is heated by power released by the OHT reaction.

Adjacent to the reaction zone, a coolant passes through the hot exchanger 18 forming a hot loop. In the absence of any circulation of the coolant, the steady thermal condition causes firstly a high temperature increase in the reaction volume 12 and secondly a reduction in the temperature as the counter current exchange with the water/oxidant mix is set up, due to the fast rate of the OHT reaction. This temperature profile can lead to very high temperatures such that the materials from which the internal tube 8 and even the wall of the main body 2 are made are damaged or even cause pyrolysis phenomena with unwanted production of graphite in the effluents. This temperature profile can also quickly reduce the extent of the reaction volume and therefore the efficient progress of the OHT reaction.

Circulation of coolant in the exchanger 18 through the circulation of the water/oxidant mix in the annular zone 10 has the consequence of extracting power adjacent to the head of the internal tube 8 (zone 8b), restoring power adjacent to the reaction zone 12 on the downstream side of the initiation of the OHT reaction, limiting heat transfer between the internal tube 8 and the main body 2 by inserting a surface with an imposed temperature, extracting power generated by the OHT reaction and not restored to preheated fluids outside the main body 2.

This circulation can control the temperature of equipment and the reaction volume so as to control the reaction rate for example by limiting the formation of pyrolysis in the injection tube, or by extending the working temperature zone so that the volume under pressure can be used better (longer residence time). This circulation also helps to keep the equipment and materials making up the equipment within an acceptable temperature range by providing a degree of freedom in controlling the installation. For example, this can separate the zone of the main body 2 concerned relative to the feed flow of water, oxidant and waste, heat exchanges between preheated fluids in the annular zone 10 and in the preheating coil 28, and also relative to the power of the OHT combustion reaction.

The temperature and flow of coolant circulation in the hot exchanger 18 can be slaved to the maximum allowable temperature at the internal wall of the main body 2 and the external wall of the internal tube 8 contained in the annular zone 10 adjacent to the zone in which power is being released. The temperature and circulation flow of the coolant may also be slaved to the minimum temperature at the external wall of the internal tube 8 and at the temperature transition zone between the hot zone and the cold zone of the main body 2.

The efficiency of this regulation is also controlled by turbulence and the exchange area available in the annular zone 10.

The heat exchange that has just been described may make it necessary to keep firstly the water/oxidant mix circulating in the annular zone 10 and secondly the diluted waste circulating in the preheating coil 28, at a temperature quite different from the ignition temperature of the OHT reaction. This temperature limitation may be imposed to control the heat transfer with the hot exchanger 18, to control the reaction rate during mixing of reagents at the top of the reaction volume in the internal tube 8, and to limit the temperature rise in the reaction volume.

In this case, even in the presence of a waste with high NCV injected into the injection tube 16, the reaction mix does not induce efficient ignition of the OHT reaction. An electrical resistance 24 immersed in the water/oxidant mix is inserted into the annular zone 10 in the immediate vicinity in which the mix is introduced into the reaction zone 12, so that the mix can be superheated such that temperature conditions are achieved conducive to ignition of the OHT reaction.

The power injected by the electrical resistance 24 may, for example but non-limitatively, be slaved to the temperature of the water/oxidant mix taken at the reaction antechamber 35 at the top (8b) of the internal tube 8. It should be noted that the electrical resistance(s) 24 may be used during the process start up phase to achieve fast ignition of the OHT reaction.

The cold exchanger 40 forming the cold loop carries a coolant on the downstream side of the zone in which the OHT reaction takes place. If there is no circulation of this coolant, effluents will be cooled within the limit of exchange capacities with the reverse current circulation of entering cold reagents consisting of the water/oxidant mix output from the inlet 32 and the waste output from the inlet 26. This temperature profile can lead to an excessive temperature at the outlet from the main body 2, such that the resistance of the sealing devices 6 and 50 of the main body on the flange 4 and of the solids management module 44 on the flange 4 can be jeopardised. In particular, it is recommended that the temperature of these sealing devices should be limited to average values of below 150° C. with peak values less than 250° C. This temperature profile can also lead to a temperature that is too high to guarantee the resistance of materials on the downstream side of the reaction zone, that is made from a material resistant to chemical species released during the OHT release at temperatures higher than the measured conditions and the moderated conditions required at the outlet from the main body. In particular, some mineral acids released by the OHT reaction containing heteroatoms (chlorine, sulphur, phosphorus) could corrode the surfaces of the main body and pipes on the downstream side at a temperature higher than about a hundred degrees.

Circulation of the coolant in the cold exchanger 40 has the consequence of very efficiently extracting residual heat not extracted by the reverse current circulation of the cold reagents that are the water/oxidant mix output from the inlet 32 and the diluted waste output from the inlet 26. This circulation reduces the temperature of effluents before reaching the cold flange 4. The temperature and flow of this circulation may therefore be slaved, for example but non-limitatively, to the temperature of effluents taken by a thermocouple immersed in the fluid adjacent to the cold interface flange 4. The efficiency of this regulation is also controlled by turbulence of the reaction medium by stirring the stirring means 14 and the exchange area available in the annular zone 10.

We will now describe the solids management module 44.

Mineral elements output from the initial waste may be present in soluble form in the aqueous phase in contact with the waste, in insoluble form in suspension in the waste or the aqueous phase, or in organic form in the waste and released in the form of salts or acid salts during the OHT reaction. The materials exposed to the OHT reaction may also be corroded depending on operating conditions and the composition of the waste (presence of heteroatoms) and release component mineral elements into the process fluid. The required hydrothermal conditions during the treatment of organic compounds can result in a very fast and extremely efficient OHT reaction with an efficiency of more than 99.9%. However, these conditions can cause precipitation of mineral elements contained in the waste and/or the water due to the large reduction in the dielectric constant of water.

The presence of solids in the effluent on the downstream side of the autoclave creates management difficulties. The process pressure is adjusted by continuously bleeding of effluents. The presence of solids with undefined sizes in the effluent at the outlet from the autoclave can cause clogging of the pipes in the long term, particularly at diameter restrictions. It can also lead to degradation of pressure regulation valves on the downstream side of the autoclave by accumulation, scratching and abrasion of restrictions performing the regulation function. Conventionally, pressure regulation devices are protected by the insertion of a cutoff threshold filter adapted to the manufacturer's recommendations. The disadvantage of this strategy is that it induces management of a secondary particle flow (for example during automatic cleaning) starting from a source at high pressure that in some applications can cause serious implementation difficulties.

There is a solids management module 44 on the downstream side of the cold interface flange 4. This module is mounted on the stirring means shaft 14 and is rotated by the magnetic motor 48. Due to its rotation, the solids treatment rotor 46 applies a mechanical action on the solids in suspension in the cooled fluid output from the reaction volume. Solubilisation of some minerals may be facilitated as a result of this mechanical action (abrasion, shear). The module mainly assures that particles are graded before they are released. Size grading is made by the rotation clearance between the solids treatment rotor 46 and the surface of the internal wall of the solids management module 44. The mechanical clearance $e_{max}$ (see FIG. 2) may be adapted to the needs and particularly to the constraints of equipment placed downstream from the reactor.

The invention claimed is:

1. An hydrothermal oxidation device for treatment of a material in a supercritical medium, comprising:
   a main body comprising a cold interface flange at a first of its ends, sealing means between the main body and the flange, the main body, the flange and the sealing means being made from materials resistant to pressures and temperatures in supercritical media;
   an internal tube placed inside the main body to form an annular zone along the main body, the internal tube comprising a cold first end and a hot second end, the first end of the internal tube being fixed in a sealed manner to the cold interface flange, the internal tube delimiting an internal reaction zone;
   a stirring means placed in the internal reaction zone of the internal tube and actuated by a rotating shaft;
   a cooling means to cool a treated material located in the internal reaction zone of the internal tube before it is evacuated from the oxidation device through a treated material outlet;
   an inlet for a water and oxidant mix located at the cold first end of the main body, the water and oxidant mix passing through the annular zone from the cold first end to the hot second end of the internal tube, before penetrating into the internal reaction zone of the internal tube;
   an effluents outlet located at the cold first end of the main body;
   an inlet for material to be treated, located at a hot second end of the main body, this inlet opening up into the internal tube, at its second end; and
   an inlet for a diluted effluent, located in the cold interface flange and connected to a preheating coil located along an internal wall of the main body and extending from its cold first end to its hot second end, the preheating coil opening up into the reaction zone of the internal tube at its hot second end.

2. The hydrothermal oxidation device according to claim 1, further comprising a heat exchanger forming a hot loop heat sink located in the annular zone and in a peripheral zone located adjacent to the hot second end of the internal tube, the hot loop heat sink drawing off heat from an hydrothermal oxidation reaction that occurs in the second end of the internal zone of the internal tube.

3. The hydrothermal oxidation device according to claim 1, further comprising a reaction antechamber located on a same side as the hot second end of the internal tube, the reaction antechamber being formed by an internal wall and an external wall closing off the internal tube, a communication passage for the mix of water and oxidant being formed in each of the internal and external walls.

4. The hydrothermal oxidation device according to claim 3, further comprising an electrical heating means located in the main body and opening up in the annular zone, close to the reaction antechamber, the heating means being protected by this arrangement from chemical aggression induced by the waste or the hydrothermal oxidation reaction.

5. The hydrothermal oxidation device according to claim 1, further comprising a heat exchanger forming a cold loop heat sink that lowers a temperature of a fluid medium after the reaction to realize conditions for a resistance of sealing devices of the main body on the flanges and to optimize solubilization of precipitated mineral species.

6. The hydrothermal oxidation device according to claim 1, further comprising a solids management module including a lid that closes off a through orifice formed in the flange, cold sealing means being provided between the solids management module and the flange.

7. The hydrothermal oxidation device according to claim 6, further comprising a solids treatment rotor driven in rotation by a magnetic drive, the solids treatment rotor having a circular shaped axial section and being adjusted to have a clearance in a corresponding diameter of the solids management module, the solids treatment rotor making it possible to perform a mechanical treatment of solids present in the cooled effluent output from a hydrothermal reaction and bringing these solids to a sufficiently small size grading so that pipes and equipment located downstream from the solids management module are not clogged.

8. A method for continuous treatment of a material by hydrothermal oxidation, comprising:
   a) introducing fluid comprising water and an oxidant into a reactor at a pressure of more than 22.1 MPa, in an annular zone formed between an internal wall of a main body of a reactor and an internal tube in the main body, at a cold first end of the main body;
   b) heating the water/oxidant fluid in the annular zone to a temperature of more than 374° C.;
   c) introducing the heated water/oxidant fluid under pressure obtained in b) into the internal tube of the reactor at a hot second end of the main body, and simultaneous introduction of the material to be treated into the internal tube at the hot second end of the main body;
   d) mixing the heated water/oxidant fluid under pressure and the material to be treated in a first part of the internal tube to oxidize the material to be treated and cooling of the fluid/oxidized material mix thus obtained in a second part of the internal tube;
   e) evacuating the fluid/oxidized material mix from the reactor at a cold first end of the main body; and
   f) adding a diluted effluent into a preheating coil, the inlet of the coil being located at the cold first end of the main body, the coil being wound along the internal wall of the main body and opening up in the first part of the internal tube.

9. The method according to claim 8, further comprising g) cooling a reaction zone located inside the internal tube at a hot second end of this internal tube by a heat exchanger forming a hot loop heat sink arranged in contact with the internal tube.

10. The method according to claim 8, wherein the water/oxidant fluid in the annular zone between the internal wall of the main body and the external wall of the internal tube is heated using:

one or plural electrical resistances located immediately adjacent to the reaction antechamber;
the hot loop heat sink; and
heat produced by the hydrothermal reaction.

11. The method according to claim 8, wherein heat is extracted from the internal tube close to its first cold end by a heat exchanger forming a cold loop heat sink, the heat exchanger lowering temperature of the fluid medium after the hydrothermal reaction and before it exits from the reactor.

12. The method according to claim 8, wherein solids present in the cooled effluent are treated mechanically by grinding them between an internal wall of a solids management module connected to a flange of the reactor and an external wall of a solids treatment rotor to obtain a sufficiently fine size grading chosen to not clog up pipes and equipment downstream from the solids management module.

* * * * *